United States Patent
Schad et al.

(10) Patent No.: US 9,815,234 B2
(45) Date of Patent: Nov. 14, 2017

(54) STACK MOLD SUPPORT STRUCTURE FOR AN INJECTION MOLDING MACHINE

(71) Applicant: Athena Automation Ltd., Vaughan (CA)

(72) Inventors: Robert D. Schad, Toronto (CA); Carsten Link, Burlington (CA); Hemant Kumar, Brampton (CA)

(73) Assignee: ATHENA AUTOMATION LTD, Vaughan (CA)

( * ) Notice: Subject to any disclaimer, the term of this patent is extended or adjusted under 35 U.S.C. 154(b) by 0 days.

(21) Appl. No.: 15/095,795

(22) Filed: Apr. 11, 2016

(65) Prior Publication Data

US 2016/0221241 A1     Aug. 4, 2016

Related U.S. Application Data (62) Division of application No. 14/272,459, filed on May 7, 2014, now Pat. No. 9,339,957.

(51) Int. Cl.
*B29C 45/17* (2006.01)
*B29C 45/32* (2006.01)
*B29L 31/00* (2006.01)

(52) U.S. Cl.
CPC .......... *B29C 45/32* (2013.01); *B29C 45/1742* (2013.01); *B29C 45/1756* (2013.01); *B29L 2031/757* (2013.01)

(58) Field of Classification Search
CPC ........ B29C 2045/326; B29C 2045/328; B29C 45/045; B29C 45/1628–2045/1632; B29C 45/1742; B29C 45/1756
See application file for complete search history.

(56) References Cited

U.S. PATENT DOCUMENTS

| | | |
|---|---|---|
| 3,319,300 A | 5/1967 | Hehl |
| 3,838,961 A | 10/1974 | Yogosawa et al. |

(Continued)

FOREIGN PATENT DOCUMENTS

| | | |
|---|---|---|
| CA | 2346494 | 5/2008 |
| CN | 202137927 | 2/2012 |

(Continued)

*Primary Examiner* — Jill Heitbrink
(74) *Attorney, Agent, or Firm* — Bereskin & Parr LLP/S.E.N.C.R.L., s.r.l.

(57) ABSTRACT

An injection molding machine includes a base, a stationary platen fixed to the base for holding a first mold section, and a moving platen for holding a second mold section. The moving platen is slidably supported on a platen slide surface fixed to the base and moveable along a machine axis between a mold closed position, in which the moving platen is drawn towards the stationary platen, and a maximum daylight position, in which the moveable platen is spaced axially apart from the stationary platen by a platen opening. The machine further includes a carriage support structure slidably supporting a stack mold carriage for holding a mold center section. The stack mold carriage is translatable parallel to the machine axis between a carriage advanced position and a carriage retracted position spaced axially apart from the carriage advanced position by a carriage stroke length. The carriage support structure includes a pair of beams removably fixed relative to the base, the beams extending parallel to the machine axis and spaced apart from each other by a lateral spacing, each beam having a beam length that is less than the platen opening and greater than the carriage stroke length.

20 Claims, 11 Drawing Sheets

(56) References Cited

U.S. PATENT DOCUMENTS

| | | | |
|---|---|---|---|
| 4,408,981 A | 10/1983 | Brown | |
| 4,929,166 A | 5/1990 | DiSimone et al. | |
| 5,090,889 A | 2/1992 | Dober et al. | |
| 5,707,666 A | 1/1998 | DiSimone et al. | |
| 5,772,420 A | 6/1998 | Holmes | |
| 6,139,305 A | 10/2000 | Nesch | |
| 6,155,811 A | 12/2000 | Looije et al. | |
| 6,394,781 B1 | 5/2002 | Lee | |
| 6,503,075 B1 * | 1/2003 | Schad | B29C 45/32 425/338 |
| 6,709,251 B2 | 3/2004 | Payette et al. | |
| 6,824,381 B2 | 11/2004 | Wohlrab | |
| 6,830,448 B2 | 12/2004 | Lichtinger | |
| 7,134,869 B2 | 11/2006 | Lichtinger | |
| 7,186,113 B2 | 3/2007 | Lichtinger | |
| 7,497,676 B2 | 3/2009 | Gram | |
| 7,568,903 B2 | 8/2009 | Sorensen | |
| 7,665,980 B2 | 2/2010 | Eigler et al. | |
| 7,665,984 B2 * | 2/2010 | Teng | B29C 45/32 425/576 |
| 8,309,011 B2 | 11/2012 | Bock | |
| 8,469,693 B2 | 6/2013 | Schad et al. | |
| 2001/0024001 A1 * | 9/2001 | Steger | B29C 45/12 264/513 |
| 2012/0052144 A1 * | 3/2012 | Schad | B29C 45/32 425/192 R |
| 2012/0328730 A1 | 12/2012 | Armbruster | |

FOREIGN PATENT DOCUMENTS

| | | |
|---|---|---|
| GB | 2300142 | 10/1996 |
| JP | 06-254906 | 9/1994 |
| WO | 2012135678 | 10/2012 |

\* cited by examiner

STACK MOLD SUPPORT STRUCTURE FOR AN INJECTION MOLDING MACHINE

This application is a divisional of U.S. patent application Ser. No. 14/272,459, filed May 7, 2014, which is hereby incorporated herein by reference.

FIELD

The disclosure relates to injection molding machines having a stack mold feature, and to apparatuses and methods for movably supporting a stack mold in an injection molding machine.

INTRODUCTION

The following is not an admission that anything discussed below is prior art or part of the common general knowledge of persons skilled in the art.

U.S. Pat. No. 6,709,251 (Payette et al) discloses a support for rotating molds used in multi-shot injection molding provides for platen mounting of a support track that may extend beneath the molds to support the rotating mold portion. The patent contends that the extensible track provides a telescoping configuration that allows a long support span independent of the mold width improving mold stability and increasing potential mold separation for easy access to the mold portions.

U.S. Pat. No. 6,824,381 (Wohlrab) discloses a rotary device for a horizontal injection molding machine that is configured in the form of a module frame which includes a base plate and a turntable rotatably mounted on the base plate. Drives are provided to move the base plate in longitudinal direction and to rotate the turntable. A fixed mold mounting plate of the injection molding machine can be mounted on a mounting structure of the module frame, whereas a moveable mold mounting plate is received in guides along the sides of the module frame.

U.S. Pat. No. 6,830,448 (Lichtinger) discloses a rotary device (4) for a horizontal injection molding machine for rotating mold portions or molded articles, disposed between the mold mounting plates, about a vertical axis. The rotary device (40) is supported completely separated from the tie bars (5-8) exclusively on the machine bed (2). The rotary device (4) includes a base plate 914) supported on the machine bed, a rotary table (13) supported on the base plate for rotation about a vertical axis, as well as drive means for turning the rotary table. The base plate (14) has a substantially H-shaped configuration, with the lateral legs (15-18) of the H resting on the machine bed (2). Turning is realized by gear (44) driven by an electric motor or hydraulic motor (49) and meshing in a ring gear (43) on the rotary table (13). The rotary table (13) is mounted on a pivot pin (19) which extends through the base plate (14) and is rotatably supported in addition by a stator (2) arranged below the base plate.

U.S. Pat. No. 8,469,693 (Schad) discloses an injection molding machine that can include a base, a stationary platen fixed to the base for holding a first mold section and a moving platen for holding a second mold section. The moving platen can be slidably supported on a platen slide surface fixed to the base. The injection molding machine can also include a stack mold carriage for holding a mold center section. An actuator can be coupled to the stack mold carriage for translating the stack mold carriage along the machine axis towards and away from the stationary platen, the actuator comprising a driven member coupled to a carriage connection portion. The carriage connection portion can transfer motion from the driven member to translation of the stack mold carriage. The carriage connection portion can be joined to the stack mold carriage at an elevation below the platen slide surface.

SUMMARY

The following summary is provided to introduce the reader to the more detailed discussion to follow. The summary is not intended to limit or define the claims.

According to one aspect, an injection molding machine, comprises a base, a stationary platen fixed to the base for holding a first mold section, and a moving platen for holding a second mold section. The moving platen is slidably supported on a platen slide surface fixed to the base and moveable along a machine axis between a mold closed position, in which the moving platen is drawn towards the stationary platen, and a maximum daylight position, in which the moveable platen is spaced axially apart from the stationary platen by a platen opening. A carriage support structure slidably supports a stack mold carriage for holding a mold center section. The stack mold carriage is translatable parallel to the machine axis between a carriage advanced position and a carriage retracted position spaced axially apart from the carriage advanced position by a carriage stroke length. The carriage support structure includes a pair of beams removably fixed relative to the base. The beams extend parallel to the machine axis and are spaced apart from each other by a lateral spacing. Each beam has a beam length that is less than the platen opening and greater than the carriage stroke length.

In some examples, each beam may be of integral, one-piece construction. Each beam may have a first end fixed to the stationary platen, and a second end fixed relative to the base.

In some examples, the first end of each beam may be mounted to an underside surface of the stationary platen. Each beam may have a second end releasably secured to the base.

In some examples, the injection machine may further comprise at least two tie bars, each tie bar extending parallel to the machine axis between the stationary and moving platens for axially clamping together the first and second mold sections during an injection cycle, wherein each beam is spaced laterally inboard of the lower tie bars.

In some examples, the carriage support structure may have a structure width generally defined by the lateral distance between laterally outer surfaces of the first and second beams. The structure width may be less than a lateral tie bar spacing between the two tie bars.

In some examples, the carriage may be removably coupled to the beams.

In some examples, the injection machine may further comprise a first linear rail mounted to the first beam, and a second linear rail mounted to the second beam. The carriage may include at least one first bearing shoe engaged with the first rail and releasably secured to the carriage, and at least one second bearing shoe engaged with the second rail and releasably secured to the carriage.

In some examples, the beams may have laterally inner surfaces directed towards each other and spaced laterally apart by a beam opening. The stack mold carriage may have an axial extent that is less than the beam opening and may be removable from the machine by rotating and lowering the stack mold carriage through the beam opening.

In some examples, the carriage support structure may be free of transverse structural members connecting together the first and second beams.

In some example, the injection machine may further comprise a platen actuator for translating the moving platen towards and away from the stationary platen. The platen actuator may include a propeller that is pivotably connected to the carriage at a vertical pivot axis, the propeller positioned at an elevation below the lower surface of the beams.

In some examples, the actuator may further include one link connecting one end of the propeller to the moving platen, and another link connecting an opposed end of the propeller to the stationary platen, each link disposed at generally the same elevation as, and outboard of, an outboard surfaces of a respective beam.

In some examples, the injection machine may further comprise a fluid manifold with at least one inlet port connectable by a flexible inlet conduit to a source of fluid and at least one delivery port, the manifold releasably mountable in a deployed position wherein fluid communication between the inlet port and the mold center section is provided via an outlet conduit attached to the outlet port, and a stowed position wherein the flexible inlet conduit remains connected to the at least one inlet port, and the outlet port is in fluid isolation from the mold center section.

In some examples, when in the deployed position the manifold may be releasably secured to the carriage by a carriage-manifold mounting structure.

In some examples, when in the stowed position, the manifold may be releasably secured to the base of the machine by a machine base-manifold mounting structure.

In some examples, the carriage may be slidable to a manifold transfer position. The manifold may have a common axial position in both the deployed and stowed positions, and the carriage-manifold mounting structure and the machine base-manifold mounting structure are both aligned with the manifold.

According to another aspect, a method of temporarily removing a stack mold carriage from an injection molding machine includes a) translating the carriage along a carriage support structure to a manifold transfer position in which a manifold secured to the carriage is aligned with securing means for securing the manifold to a base of the machine; and b) releasing the manifold from the carriage and engaging the securing means to secure the manifold to the base of the machine.

In some examples, after step b) the carriage may be released from the carriage slide surface and lowered between a pair of beams of the support structure.

In some examples, after step b) the support structure may be released from the base and raised between axially spaced apart platens and laterally spaced apart tie bars of the machine.

Other aspects and features of the present specification will become apparent, to those ordinarily skilled in the art, upon review of the following description of specific examples of the teaching disclosed herein.

DRAWINGS

Reference is made in the detailed description to the accompanying drawings, in which.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1:
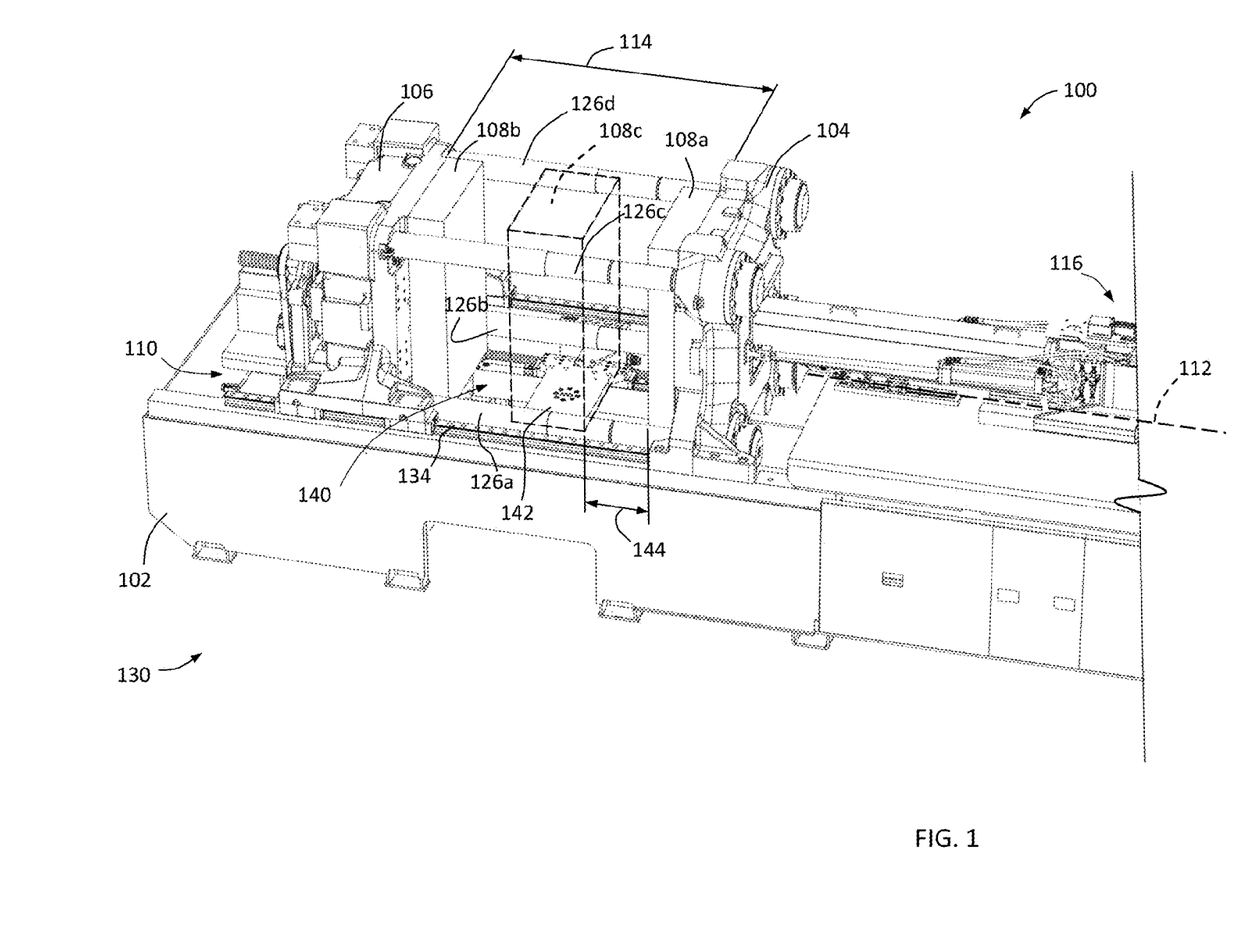
FIG. 1 is a perspective view of an injection molding machine with the moving platen spaced away from the stationary platen.
Figure 2:
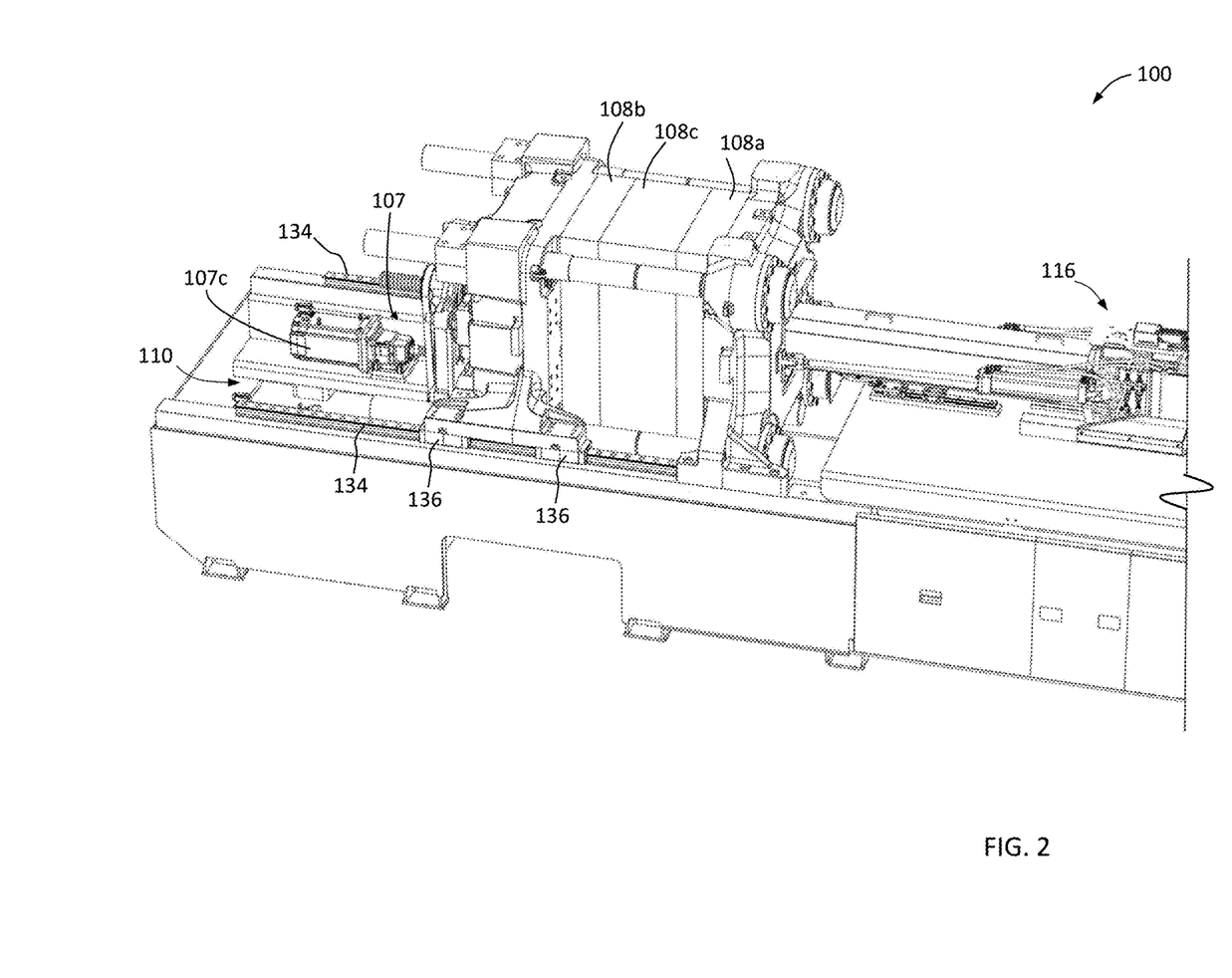
FIG. 2 is similar to FIG. 1, but showing the machine in a mold-closed condition.

Referring to FIGS. 1 and 2, an injection molding machine 100 includes a base 102, a stationary platen 104 fixed to the base 102 for holding a first mold section 108a, and a moving platen 106 for holding a second mold section 108b. The moving platen 106 is slidably supported on a platen slide surface 110 fixed to the base 102, and is moveable towards and away from the stationary platen 104 along a machine axis 112. The moving platen is generally moveable along the platen slide surface 110 between a mold-closed position (FIG. 2), wherein the moving platen is positioned nearest the stationary platen, and a maximum daylight position (FIG. 1), wherein the moving platen is spaced apart from the stationary platen by a platen opening 114.

The platen slide surface 110 may comprise a pair of platen rails 134 positioned on laterally opposed sides of the base 102 and extending parallel to the machine axis 112. In the example illustrated, the moving platen 106 includes platen bearing shoes 136 (FIG. 2) fixed to the moving platen 106 and slidably engaged with the platen rails 134.

Figure 3:
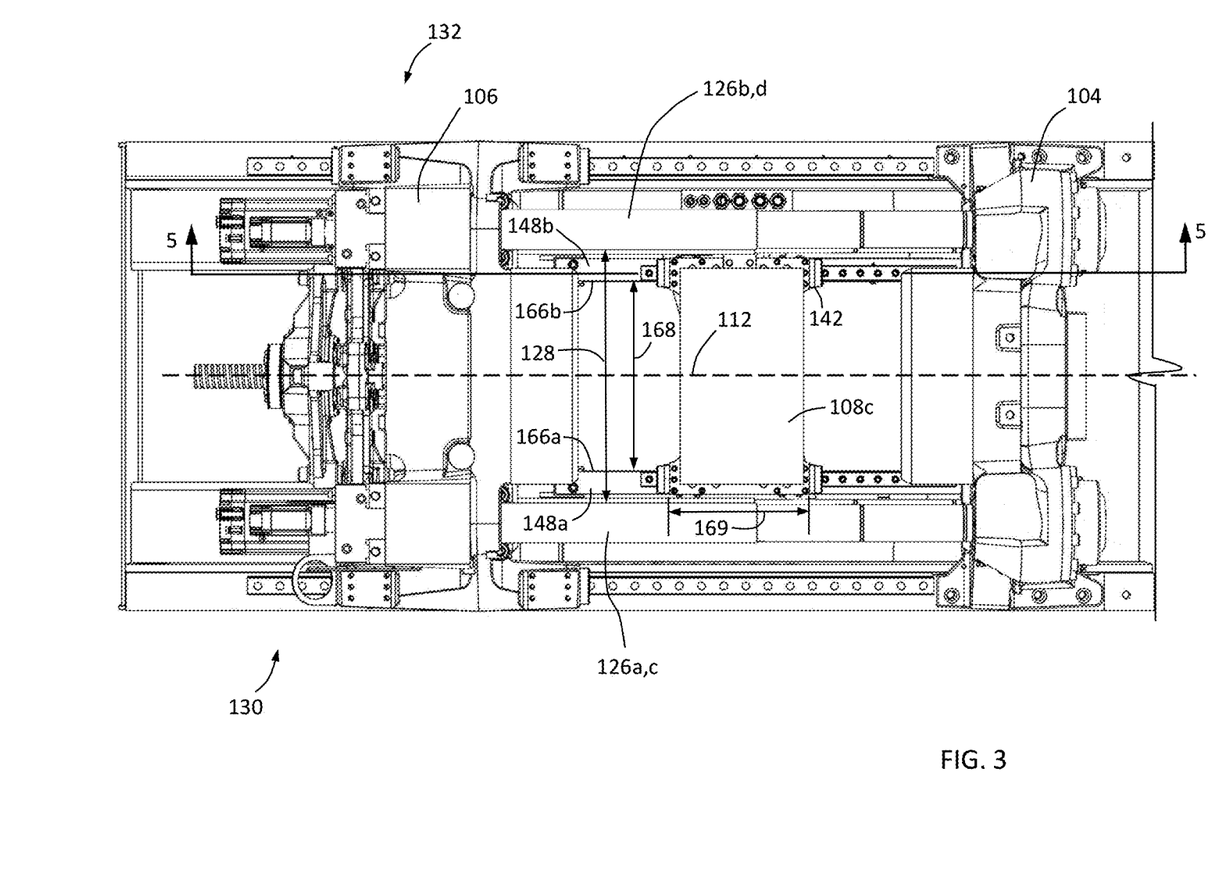
FIG. 3 is a top view of a clamp portion of the machine of FIG. 1.

The machine 100 may further include a plurality of tie bars 126 extending parallel to the machine axis 112 and between the stationary and moving platens 104, 106, for axially clamping together the mold sections 108 during an injection cycle. In the example illustrated, the machine 100 includes a front lower tie bar 126a and a rear lower tie bar 126b spaced transversely apart (by a lateral tie bar spacing 128—FIG. 3) along opposing sides of the machine 100. The front lower tie bar 126a is, in the example illustrated, disposed towards an operator side 130 of the machine 100, and the rear lower tie bar 126b is disposed towards a non-operator side 132 of the machine 100 with the machine axis 112 positioned laterally intermediate the front and rear lower tie bars 126a, 126b. The machine 100 may further include a front upper tie bar 126c spaced vertically above the front lower tie bar 126a, and a rear upper tie bar 126d spaced vertically above the rear lower tie bar 126b.

In the example illustrated, the machine 100 further includes a mold center section 108c positioned axially intermediate the first and second mold sections 108a, 108b. An injection unit 116 is supported on the base 102 and injects resin (or another injection compound) into mold cavities formed by the mold sections 108 when the mold is closed.

With reference again to FIG. 1, the machine 100 further includes a carriage support structure 140 slidably supporting a stack mold carriage 142 for holding the mold center section 108c. The stack mold carriage 142 is translatable parallel to the machine axis 112 between a carriage advanced position generally corresponding to the mold-closed position (FIG. 2) and a carriage retracted position generally corresponding to a mold-open position (FIG. 1). The carriage retracted position is spaced axially apart from the carriage advanced position by a carriage stroke length 144.

Figure 4:
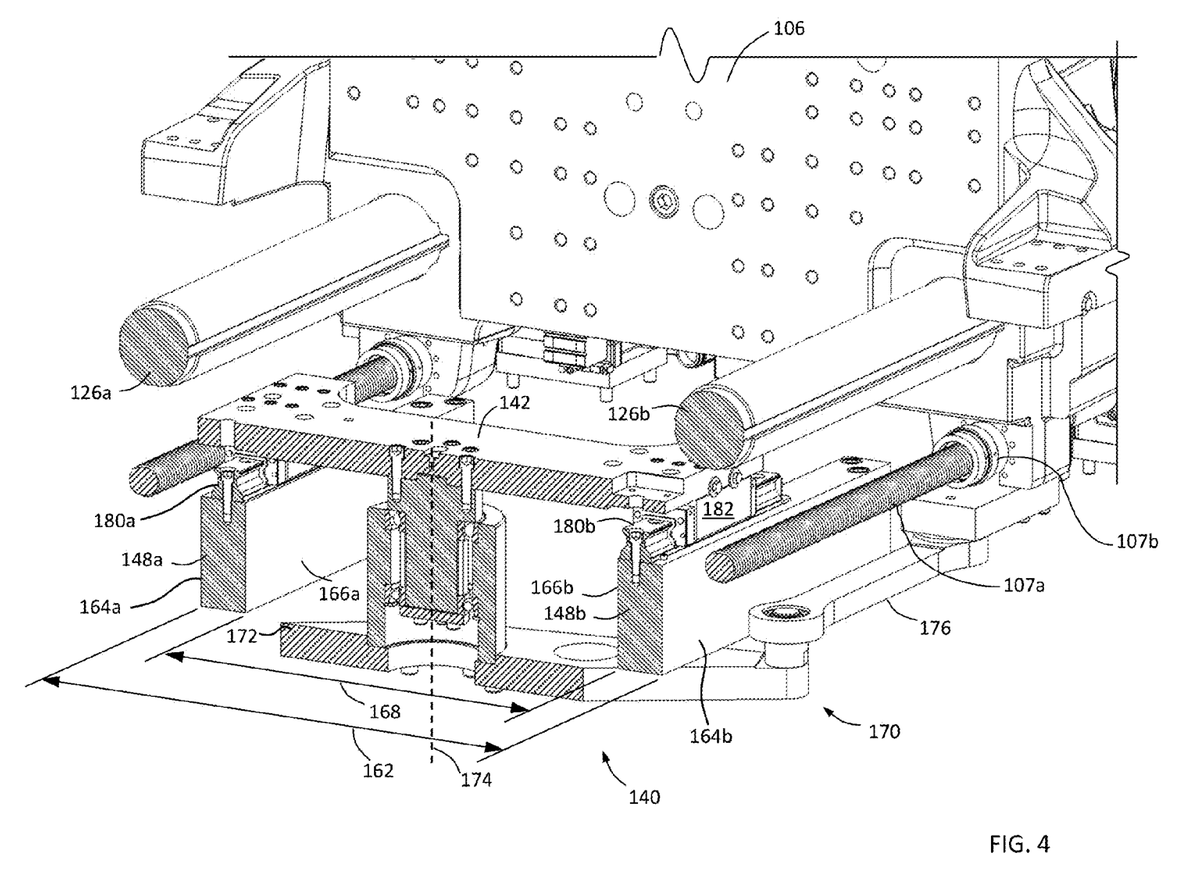
FIG. 4 is a cross-sectional perspective view of a portion of the machine of FIG. 1 showing portions of a carriage support structure.

With further reference to FIG. 4, the carriage support structure 140 includes a pair of beams 148 removably fixed relative to the base. The beams 148 extend parallel to the machine axis 112 and are spaced apart from each other laterally. The pair of beams 148 includes a first beam 148a disposed towards the operator side 130 of the machine 100, and a second beam 148b disposed towards the non-operator side 132 of the machine 100.

Figure 5:
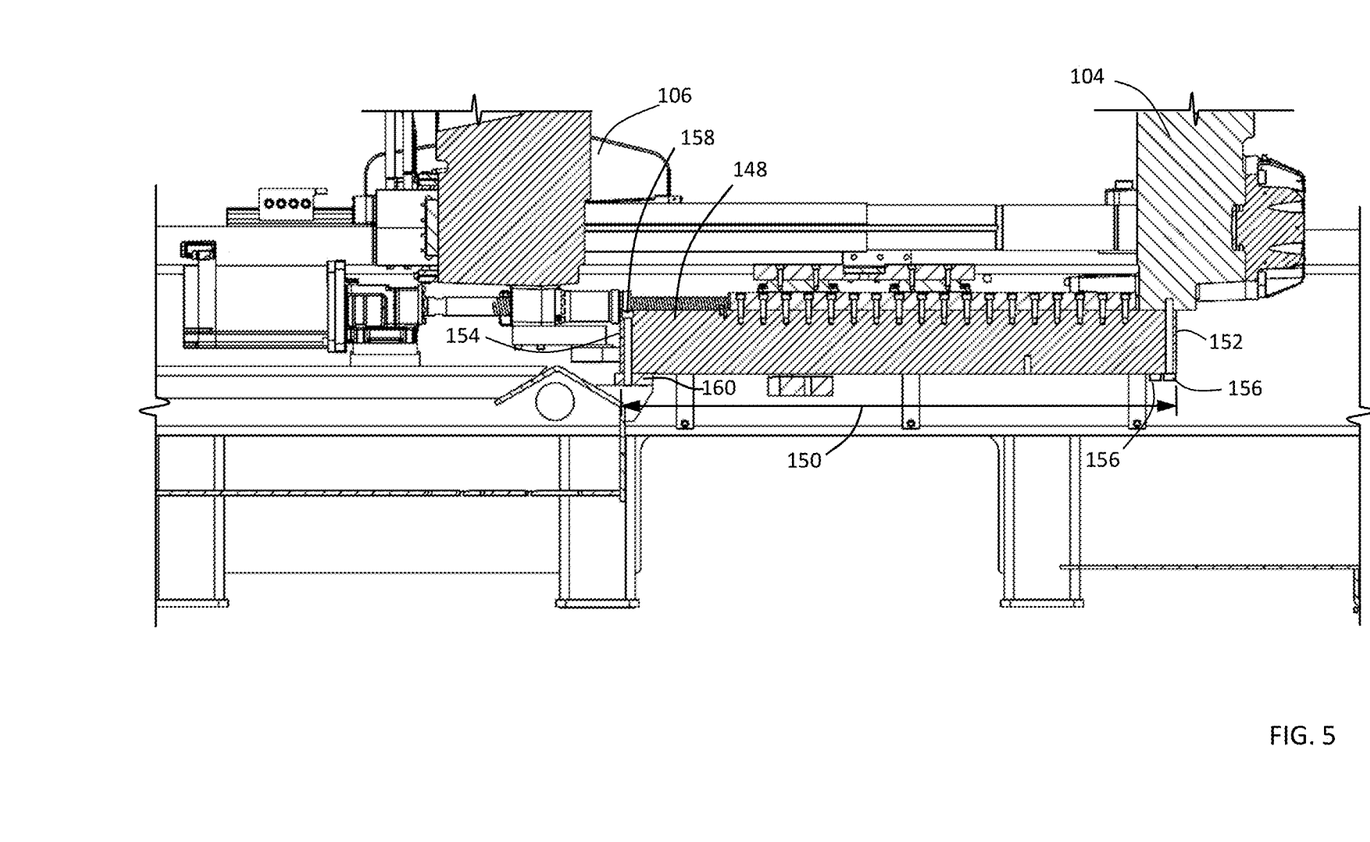
FIG. 5 is a cross-sectional view of the structure of FIG. 3, taken along the lines 5-5.
Figure 6:
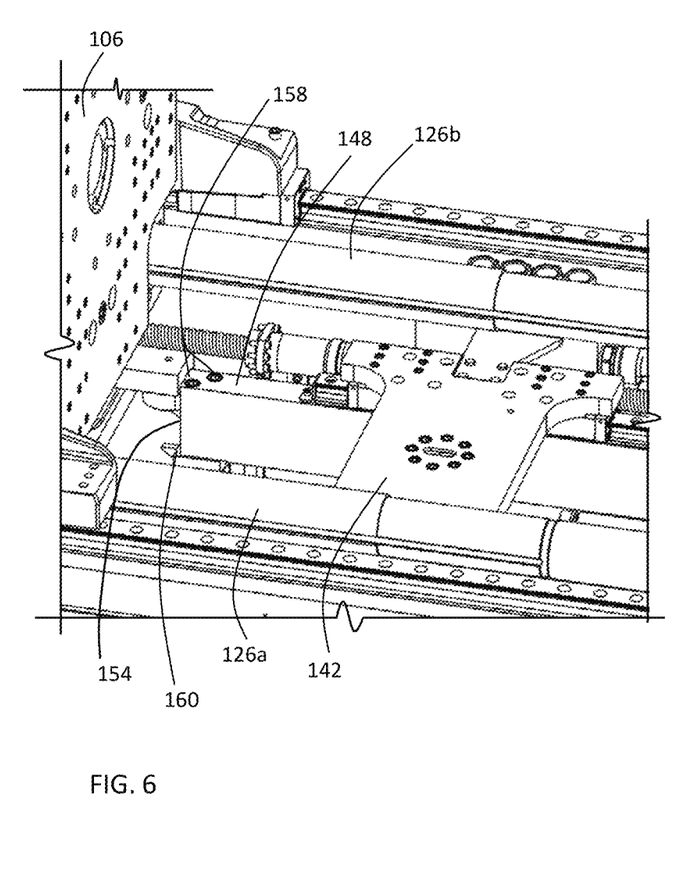
FIG. 6 is a perspective view of a portion of the carriage support structure of the machine of FIG. 1 adjacent the moving platen.
Figure 7:
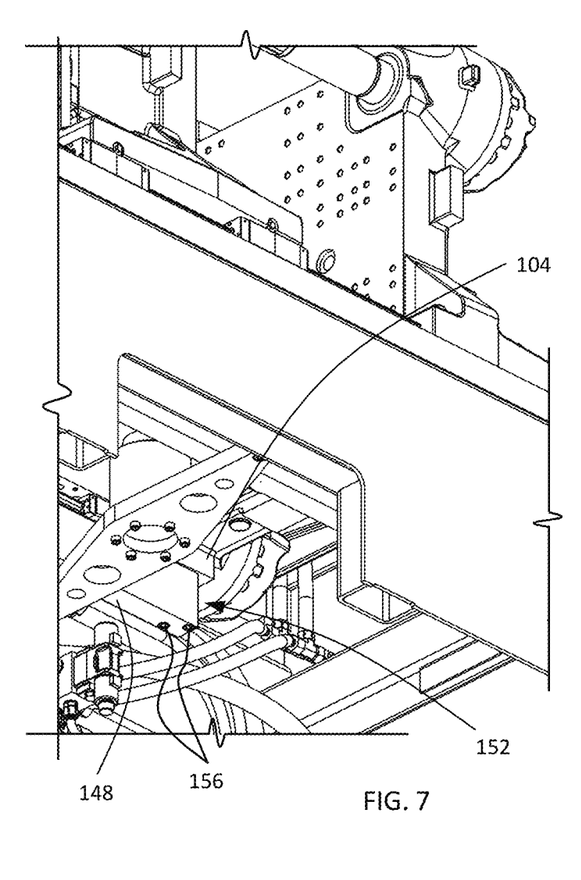
FIG. 7 is a perspective view of a portion of the carriage support structure of the machine of FIG. 1 adjacent the stationary platen.

Each beam 148a, 148b is positioned laterally inboard of the respective lower tie bar 126a, 126b. Each beam 148a, 148b has a beam length 150 that extends axially between opposite ends 152, 154 of each beam 148 (FIG. 5). The beam length 150 of each beam 148a, 148b is, in the example illustrated, less than the platen opening 114 and greater than the carriage stroke length 144. Each beam 148 can be of integral, one piece construction. In the example illustrated, each beam 148 is a unitary length of steel having a generally rectangular cross-sectional profile.

The first end 152 of each beam 148 can be releasably secured to the stationary platen 104. In the example illustrated, first end bolts 156 secure the first end 152 of the beam 148 to an underside surface of the stationary platen 104. The second end 154 of each beam 148 can be releasably secured to the base 102 of the machine 100. In the example illustrated, second end bolts 158 secure the second end of each beam to an upwardly directed step surface 160 of the base.

Referring again to FIG. 4, the carriage support structure 140 has a structure width 162 generally defined by the lateral distance between laterally outboard surfaces 164a, 164b of the first and second beams 148a, 148b. The structure width 162 is, in the example illustrated, less than the lateral tie bar spacing 128. This can facilitate removing the carriage 142 with the beams 148 by lifting them up together between the tie bars 126. In the example illustrated, the carriage support structure 140 is free of transverse structural members connecting together the first and second beams 148a, 148b. In some examples, such transverse structural members may be provided, for example, at either or both ends of the beams.

The beams 148 have laterally inboard surfaces 166 directed towards each other that are spaced laterally apart to define a beam opening 168. The stack mold carriage 142 has an axial extent 169 that is less than the beam opening. This can facilitate a manner for removing the carriage 142 by rotating the carriage (by about 90 degrees) and lowering the carriage between the beam opening 168.

Referring still to FIG. 4, an actuator 170 is coupled to the stack mold carriage 142 for translating the stack mold carriage 142 along the machine axis 112 towards and away from the stationary platen 104. In the example illustrated, the actuator 170 includes a propeller 172 that is pivotably connected to the carriage 142 at a vertical pivot axis 174. The actuator 170 further includes one link 176 connecting one end of the propeller 172 to the moving platen 106, and another link (not shown) connecting an opposed end of the propeller 172 to the stationary platen 104. In the example illustrated, the propeller 172 is positioned at an elevation just below the lower surface of the beams 148. Each link 186 is disposed at the generally same elevation as, and outboard of, the outboard surfaces 164 of a respective beam.

The beams 148 can support a pair of stack mold carriage rails 180 along which the stack mold carriage 142 is slidable. In the example illustrated, a first rail 180a is mounted to the first beam 148a, and a second rail 180b is mounted to the second beam 148b. The stack mold carriage 142 is, in the example illustrated, provided with carriage shoes 182 slidably engaged with the carriage rails 180. In the example illustrated, the stack mold carriage rails 180 are separate from, and positioned laterally inboard of, the platen rails 134. The carriage rails 180 are also, in the example illustrated, positioned at an elevation below that of the platen rails 134.

Figure 8:
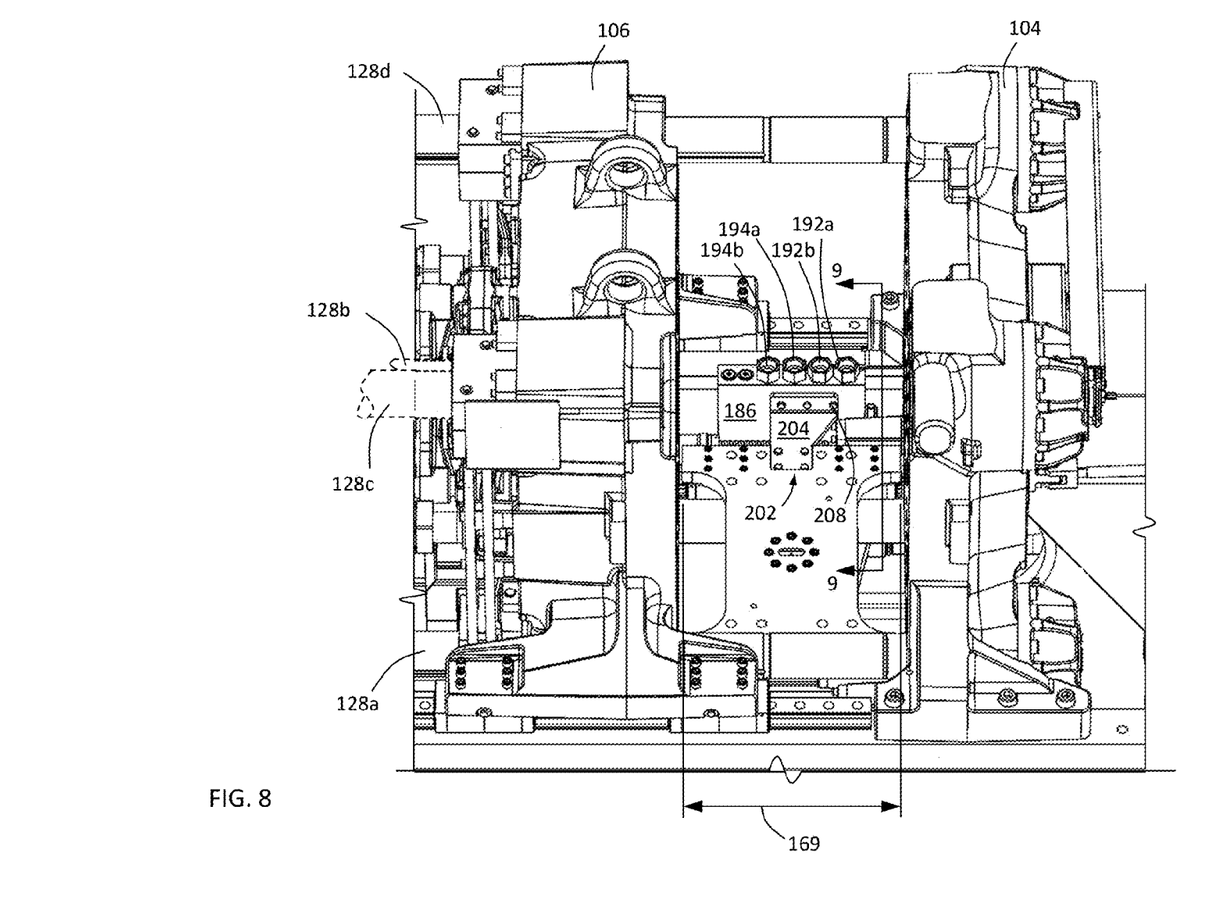
FIG. 8 is a perspective view of a portion of the machine of FIG. 1, looking between the platens from the operator side.
Figure 12:
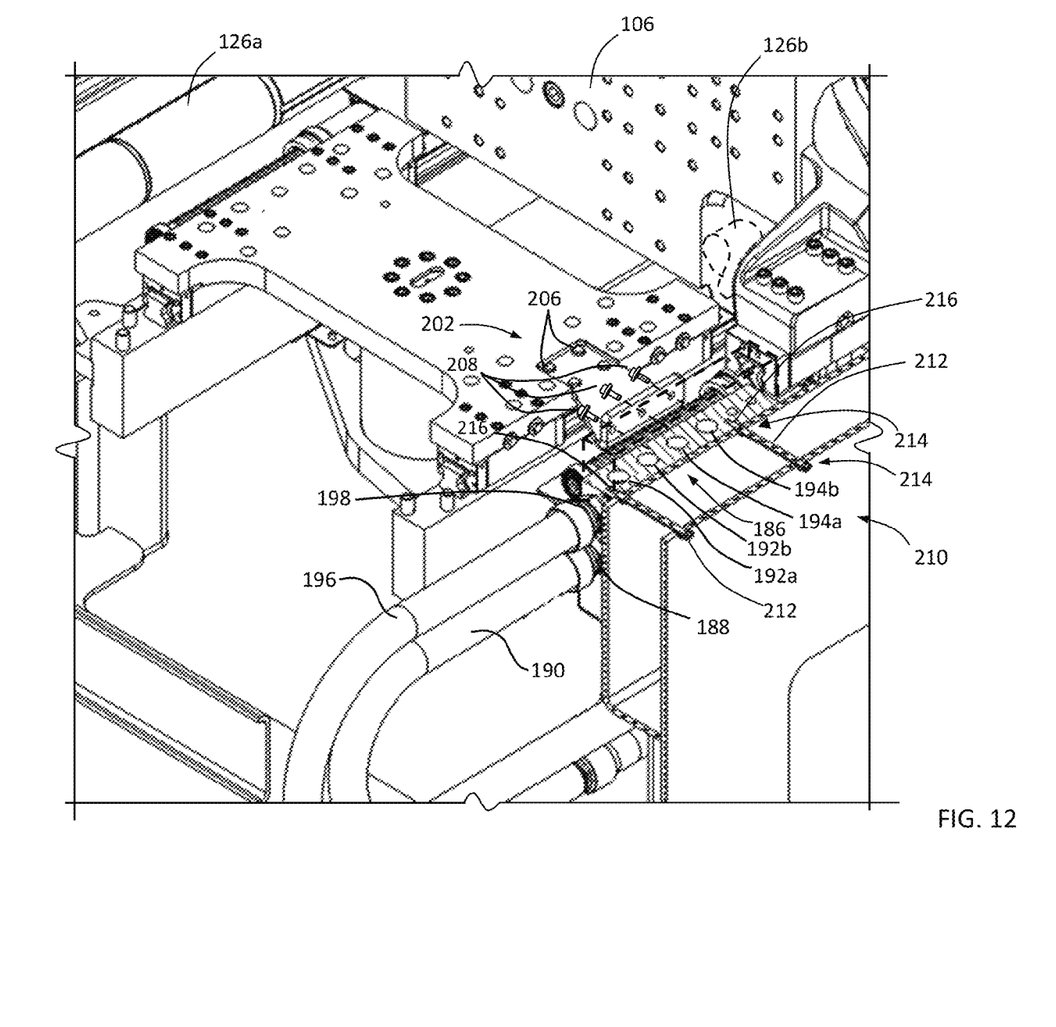
FIG. 12 is a perspective view of a portion of the machine of FIG. 1, showing the carriage in the manifold-transfer position, and a portion of the base and an upper portion of the manifold in phantom.

Referring now to FIGS. 8 and 12, the machine 100 further includes an optional fluid manifold 186 for providing at least one fluid to the mold center section 108c. The manifold 186 has at least one inlet port 188 connectable by a flexible inlet conduit 190 to a source of fluid, and at least one delivery port 192 connectable to the mold center section 108c by a delivery conduit. A return conduit can be connected to at least one return port 194 of the manifold 186 for returning the fluid from the mold center section 108c to the manifold 186, and a flexible outlet conduit 196 connected to an outlet port 198 of the manifold 186 can further return the fluid from the manifold 186 back toward the source of fluid.

In the example illustrated, the manifold 186 has: one inlet port 198 for receiving a mold coolant fluid (such as water); two delivery ports 192a, 192b for delivering the coolant fluid to opposite sides of the mold center section 108c; two return ports 194a, 194b for receiving the coolant fluid back from the mold center section 108c; and one outlet port 198 for directing the coolant fluid back toward the fluid source.

The manifold 186 is releasably mountable in a deployed position (FIGS. 8 and 9) wherein fluid communication between the inlet port 188 and the mold center section 108c is provided via delivery conduits attached to the delivery ports 192, and a stowed position (FIGS. 10 and 11) wherein the flexible inlet conduit 190 can remain connected to the at least one inlet port 188, and the delivery ports 192 are in fluid isolation from the mold center section 108*c*.

When in the deployed position, the manifold is releasably secured to the carriage 142 by a carriage-manifold mounting structure 202 (see FIGS. 8 and 12). In the example illustrated, the carriage-manifold mounting structure 202 comprises a bracket 204 having one arm 204*a* secured by fasteners 206 to an upper surface of the carriage 142, and another arm 204*b* secured by fasteners 208 to an inner surface 186*a* of the manifold 186.

Figure 10:
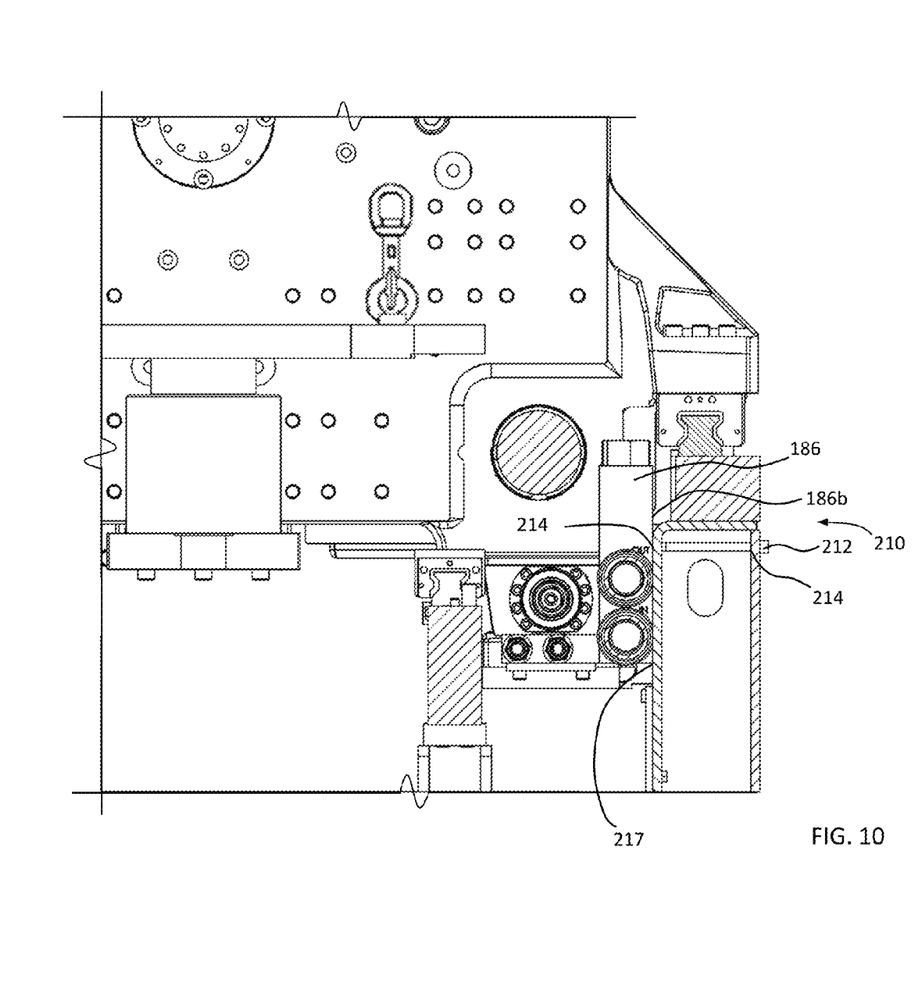
FIG. 10 is similar to FIG. 9, but showing the manifold in the stowed position and the carriage partially lifted away from the machine.
Figure 11:
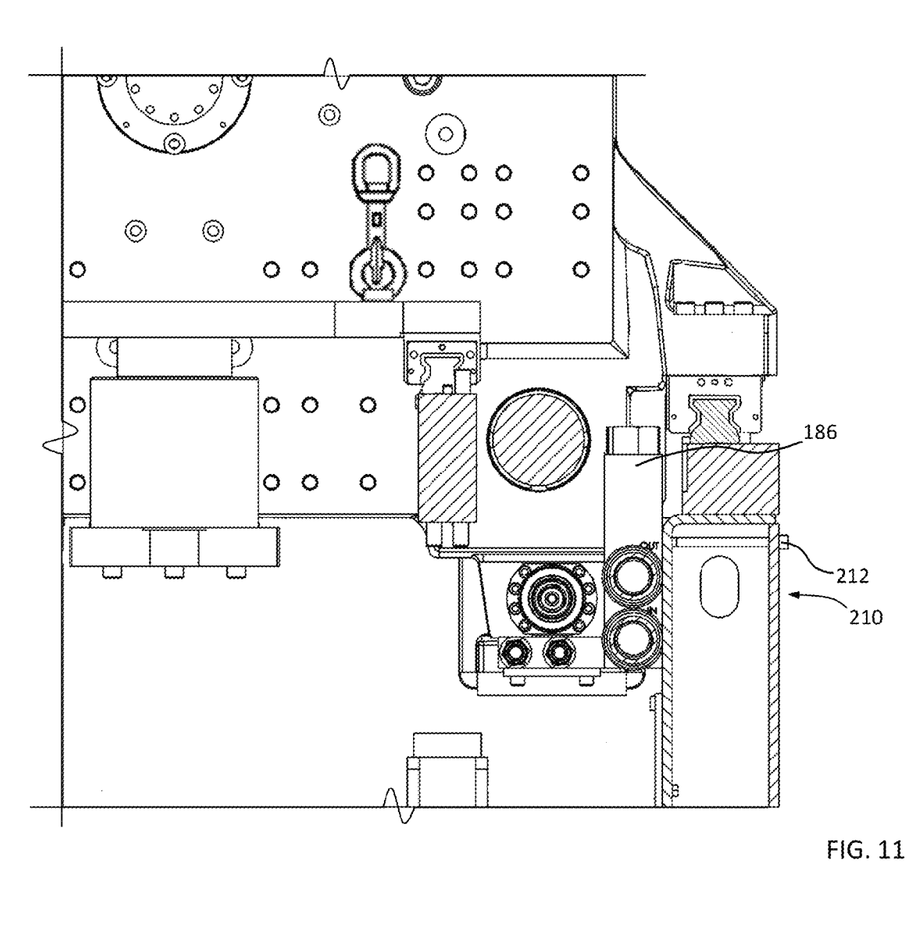
FIG. 11 is similar to FIG. 10, but showing the beam being lifted away from the machine with the carriage.

When in the stowed position, the manifold is releasably secured to the base of the machine by a machine base-manifold mounting structure 210 (FIG. 10). In the example illustrated, the machine base-manifold mounting structure 210 comprises a pair of fasteners 212 that pass through apertures 214 in a sidewall of the base 102, and engage threaded bores 216 in an outer surface 186*b* of the manifold 186.

Figure 9:
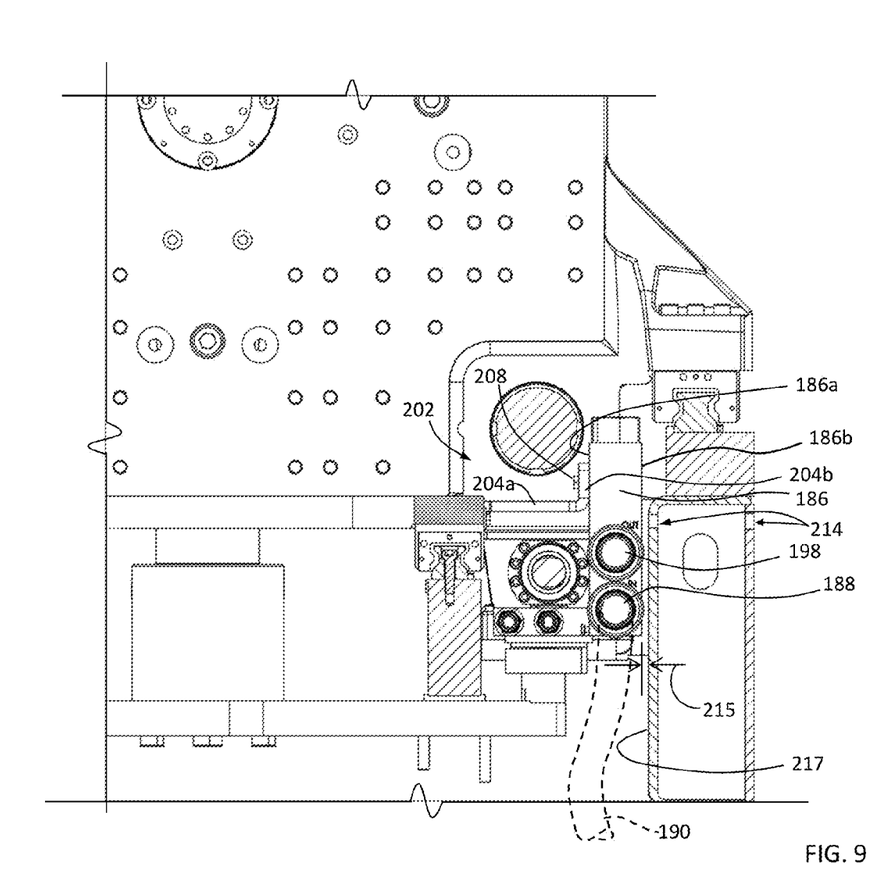
FIG. 9 is a cross-sectional view of a portion of the structure shown in FIG. 8, taken along the lines 9-9.

To facilitate moving the manifold between the deployed and stowed positions, the carriage 142 is optionally slidable along its axis of travel to a manifold transfer position (FIG. 12). When the carriage is in the transfer position, the manifold has a common axial position in both the deployed and stowed positions, and the carriage-manifold mounting structure 202 and the machine base-manifold mounting structure 210 are both aligned with the manifold 186. In the example illustrated, when the manifold 186 is in the deployed position and the carriage 142 is in the transfer position, the outer surface 186*b* of the manifold 186 is spaced laterally apart from a facing surface fixed to the base by a gap 214 (FIG. 9). Moving the manifold to the stowed position corresponds to a lateral movement of the manifold that closes the gap 214. The fasteners of the machine base-manifold mounting structure can, in the example illustrated, be thread-started into the threaded bores 216 of the manifold 186 before the bracket 204 of the carriage-manifold mounting structure 202 is released.

In use, a method of temporarily removing a stack mold carriage 142 from an injection molding machine can include translating the carriage 142 along a carriage support structure 140 to a manifold transfer position in which a manifold 186 secured to the carriage 142 is aligned with the machine base-manifold mounting structure for securing the manifold to a base of the machine; and then releasing the manifold from the carriage and engaging the machine base manifold mounting structure to secure the manifold 186 to the base 102 of the machine 100.

After the manifold 186 is released from the carriage 142, the carriage 142 can be released from the carriage support structure 140 (e.g. by disconnecting the carriage from the carriage bearing shoes), and can be rotated 90 degrees and lowered between the pair of beams 148 of the support structure 140.

Additionally or alternatively, after the manifold 186 is released from the carriage 142, the support structure 140 can be released from the base 102 and can then then be raised between the axially spaced apart platens 104, 106 and laterally spaced apart tie bars 126 of the machine 100.

While the above description provides examples of one or more processes or apparatuses, it will be appreciated that other processes or apparatuses may be within the scope of the accompanying claims.

The invention claimed is:

1. An injection molding machine, comprising:
   a) a base;
   b) a stationary platen fixed to the base for holding a first mold section;
   c) a moving platen for holding a second mold section, the moving platen slidably supported on a platen slide surface fixed to the base and moveable along a machine axis between a mold closed position, in which the moving platen is drawn towards the stationary platen, and a maximum daylight position, in which the moveable platen is spaced axially apart from the stationary platen by a platen opening; and
   d) a carriage support structure slidably supporting a stack mold carriage for holding a mold center section, the stack mold carriage translatable parallel to the machine axis between a carriage advanced position and a carriage retracted position spaced axially apart from the carriage advanced position by a carriage stroke length, the carriage support structure including a pair of beams removably fixed relative to the base, the beams extending parallel to the machine axis and spaced apart from each other by a lateral spacing, each beam having a beam length that is less than the platen opening and greater than the carriage stroke length.

2. The machine of claim 1, wherein each beam is of integral, one-piece construction.

3. The machine of claim 2, wherein each beam has a first end fixed to the stationary platen, and a second end fixed relative to the base.

4. The machine of claim 3, wherein the first end of each beam is mounted to an underside surface of the stationary platen.

5. The machine of claim 3, wherein each beam has a second end releasably secured to the base.

6. The machine of claim 1, further comprising at least two lower tie bars, each tie bar extending parallel to the machine axis between the stationary and moving platens for axially clamping together the first and second mold sections during an injection cycle, wherein each beam is spaced laterally inboard of the lower tie bars.

7. The machine of claim 6, wherein the carriage support structure has a structure width generally defined by the lateral distance between laterally outer surfaces of the first and second beams, and wherein the structure width is less than a lateral tie bar spacing between the lower tie bars.

8. The machine of claim 1, wherein the carriage is removably coupled to the beams.

9. The machine of claim 8, further comprising a first linear rail mounted to the first beam, and a second linear rail mounted to the second beam, and wherein the carriage includes at least one first bearing shoe engaged with the first rail and releasably secured to the carriage, and at least one second bearing shoe engaged with the second rail and releasably secured to the carriage.

10. The machine of claim 8, wherein the beams have laterally inner surfaces directed towards each other and spaced laterally apart by a beam opening, and wherein the stack mold carriage has an axial extent that is less than the beam opening, the stack mold carriage removable from the machine by rotating and lowering the stack mold carriage through the beam opening.

11. The machine of claim 1, wherein the carriage support structure is free of transverse structural members connecting together the first and second beams.

12. The machine of claim 1 further comprising a platen actuator for translating the moving platen towards and away from the stationary platen, wherein the platen actuator includes a propeller that is pivotably connected to the carriage at a vertical pivot axis, the propeller positioned at an elevation below a lower surface of the beams.

13. The machine of claim 12, wherein the actuator further includes one link connecting one end of the propeller to the moving platen, and another link connecting an opposed end of the propeller to the stationary platen, each link disposed at generally the same elevation as, and outboard of, an outboard surface of a respective beam.

14. An injection molding machine, comprising:
  a) a base;
  b) a stationary platen fixed to the base for holding a first mold section;
  c) a moving platen for holding a second mold section, the moving platen slidably supported on a platen slide surface fixed to the base and moveable along a machine axis between a mold closed position, in which the moving platen is drawn towards the stationary platen, and a maximum daylight position, in which the moveable platen is spaced axially apart from the stationary platen by a platen opening; and
  d) a carriage support structure slidably supporting a stack mold carriage for holding a mold center section, the stack mold carriage translatable parallel to the machine axis between a carriage advanced position and a carriage retracted position spaced axially apart from the carriage advanced position by a carriage stroke length, the carriage support structure including a pair of beams fixed relative to the base, the beams extending parallel to the machine axis and spaced apart from each other by a lateral spacing, each beam of integral, one-piece construction along a beam length extending between a first end and a second end, the first end fixed to the stationary platen and the second end fixed relative to the base,
  wherein the beam length is less than the platen opening and greater than the carriage stroke length.

15. An injection molding machine, comprising:
  a) a base;
  b) a stationary platen fixed to the base for holding a first mold section;
  c) a moving platen for holding a second mold section, the moving platen slidably supported on a platen slide surface fixed to the base and moveable along a machine axis between a mold closed position, in which the moving platen is drawn towards the stationary platen, and a maximum daylight position, in which the moveable platen is spaced axially apart from the stationary platen by a platen opening, the platen slide surface including a pair of platen rails extending parallel to the machine axis along laterally opposed sides of the base, the platen rails in sliding engagement with the moving platen; and
  d) a carriage support structure slidably supporting a stack mold carriage for holding a mold center section, the stack mold carriage translatable parallel to the machine axis between a carriage advanced position and a carriage retracted position spaced axially apart from the carriage advanced position by a carriage stroke length, the carriage support structure including a pair of beams releasably fixed relative to the base, each beam extending parallel to the machine axis between a first end and a second end and the beams spaced apart from each other by a lateral spacing, and the carriage support structure including a respective carriage rail fixed to each beam, the carriage rails positioned laterally inboard of the platen rails.

16. The machine of claim 15, wherein the second end of each beam is releasably secured to an upwardly directed step surface of the base.

17. The machine of claim 15, wherein the first end of each beam is releasably secured to an underside surface of the stationary platen.

18. The machine of claim 17, wherein each beam has a beam upper surface and a linear rail mounted to the beam upper surface.

19. The machine of claim 18, wherein an end surface portion of the beam upper surface extends past the linear rail at the first end of each beam, the end surface portion of each beam bearing against the underside of the stationary platen when releasably secured thereto.

20. The machine of claim 15, further comprising at least two lower tie bars, each tie bar extending parallel to the machine axis between the stationary and moving platens for axially clamping together the first and second mold sections during an injection cycle, wherein each carriage rail is spaced at an elevation below that of the lower tie bars and laterally inboard of the lower tie bars.

* * * * *